Figure 1:
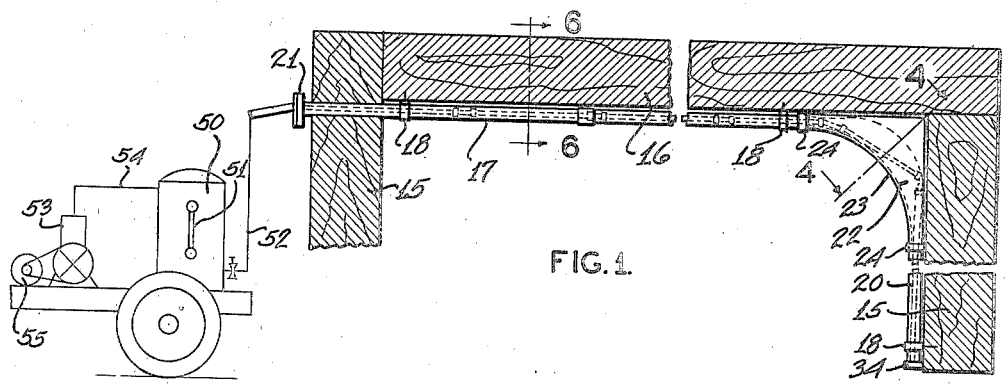

June 24, 1941.   W. B. HILL   2,246,731
PREVENTION OF INSECT DAMAGE
Filed July 8, 1939   2 Sheets--Sheet 1

INVENTOR
WALTER B. HILL
BY
ATTORNEY.

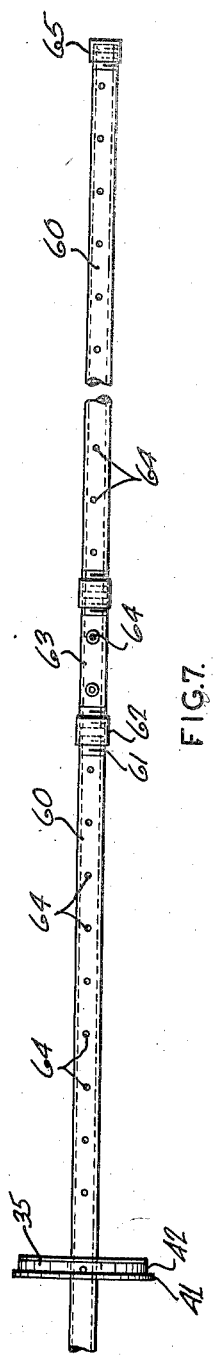
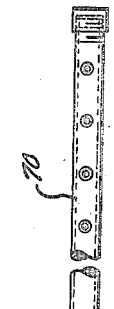
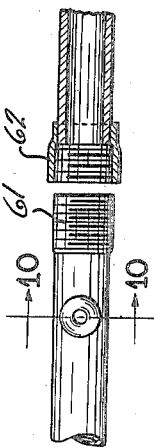
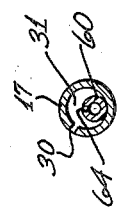
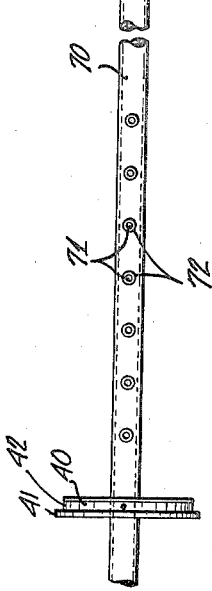

Patented June 24, 1941

2,246,731

UNITED STATES PATENT OFFICE 2,246,731

PREVENTION OF INSECT DAMAGE

Walter B. Hill, Memphis, Tenn.

Application July 8, 1939, Serial No. 283,463

6 Claims. (Cl. 43—124)

This invention relates to improvements in the prevention of insect damage, particularly to an improved method and means for preventing and arresting damage to wood building elements by termites or other insect life, the improved method embodying the application of fluid toxic substances to the structural elements of the building. Although the invention has the primary objective of the extermination and prevention of termites, it may also be noted that the treatment to be described possesses a marked killing and deterring effect on other insects as well as rodents, and so serves admirably to prevent damage to the wood elements of building structures generally, by insect and animal life.

The present application is predicated on certain improvements over the means for eradicating insects disclosed and claimed in Letters Patent No. 1,795,488 issued to this applicant March 10, 1931.

In the provision of means providing a permanent or semi-permanent duct system for the application of a wood-treating solution, exterminating contractors are confronted with the difficulty of stoppage of the ducts, due in part to the effect of dirt, internal rusting of the piping, and other causes which tend, some time following installation, to block up part or all of the fluid outlet orifices of conduits of the usual form. This difficulty is particularly noticeable in instances where the piping is installed in inaccessible or difficultly accessible locations. The present invention has an important object, the elimination of the difficulties above referred to, and the provision of means and methods whereby the piping or conduit for the liquid toxic, may be introduced to and removed from remote or normally inaccessible zones but, at the time of treatment, may be definitely directed or guided to the optimum zone or location of application of the wood-treating liquid or solution. The situations normally encountered in the treatment of buildings, and to which the present invention is particularly, but not exclusively applicable, are found in the fully-enclosed foundations of porches, sun parlors, or other adjunctive portions of dwellings which are not provided with basements, cellars or the like, being usually characterized by a masonry or concrete foundation wall extending around two, three or four sides, and backfilled usually up to the ground level or nearly so. Because of the usual difficulty of access to such locations, damage by termites or other insect life is most apt to occur in places of the nature referred to, and the invention has as one of its objectives, the provision of means whereby structures of this type may be periodically treated with a toxic fluid supplied under pressure, from a point externally to the foundation structure and without necessarily requiring personal access to points under the building. More specifically expressed, the invention includes as an important object, the provision of one or more permanent guide elements such as a sheath pipe, into which is inserted, at the time of treatment and to be removed thereafter, a special flexible conduit through which is introduced internally of the sheath pipe, the liquid for treating the timber elements of wood building structures.

Yet another object of the invention is attained in an arrangement generally described in the preceding object, in which the sheath pipe is characterized by slotted openings of substantial length and in which the chemical pipe is so constructed as to possess a requisite flexibility and further so arranged as to maintain the liquid under a substantial pressure through the full length of both the chemical and sheath pipes.

An additional object of the invention is attained in an improved low-cost sheath pipe construction for the purpose noted.

A still further object of the invention is attained in a system of liquid application for the purpose of termite control or the like, adapted for the introduction of liquid at greater distances from the point of ready access to the building, than in the case of heretofore prevailing systems, and to supply the liquid at unusually high pressures for increased wood penetration and increased carrying power of the spray stream of the treating liquid so as to enable an efficient treatment of the wood more remote from the accessible exterior of the building than theretofore possible.

A still further object of the invention is attained in means and a system of apparatus for the purpose noted, and in which the permanently installed conduit system in each building is kept at a minimum cost, and further such that the high-pressure liquid application means may be utilized as a portable unit and moved from building to building by the exterminating contractor, for periodic treatment more efficiently and at a lower cost than theretofore possible.

Figure 3:
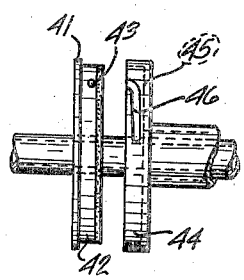
Figure 2:
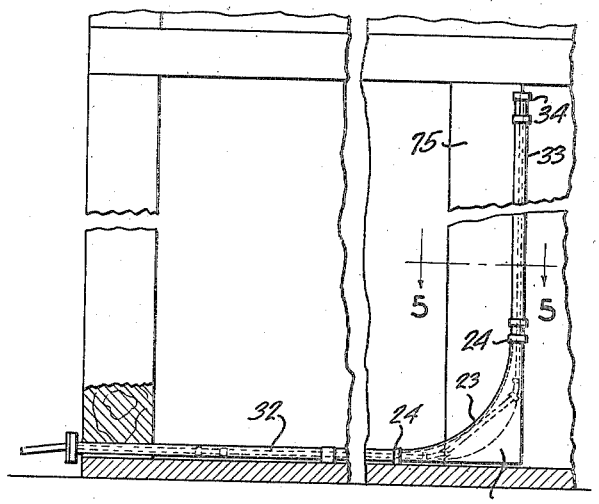
Figure 4:
Figure 5:
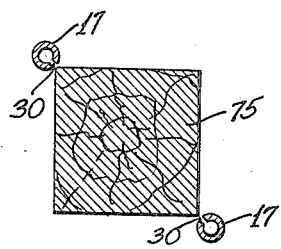
Figure 6:
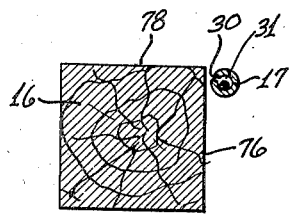

The foregoing and numerous other objects of the invention will appear from the following detailed description of certain presently preferred embodiments and practices identified therewith, particularly when considered in connection with the accompanying drawings, in which:

Fig. 1 is a fragmentary horizontal section through the foundation elements of a building, wholly or partly of wood construction, showing a suggested manner of installation of apparatus employed in the practice of the present invention; Fig. 2 is a fragmentary vertical section showing one form of the arrangement as installed for the treatment of vertical timbers; Fig. 3 is a side elevation of a preferred form of fluid pipe joint for connection of the high pressure conduit system into the sheath pipe or the like; Fig. 4 is a detailed sectional elevation as taken along line 4—4 of Fig. 1; Fig. 5 is a sectional elevation as viewed along line 5—5 of Fig. 2, showing a preferred arrangement of sheath or guide pipes; Fig. 6 is a view along line 6—6 of Fig. 1, showing a preferred location and arrangement of sheath pipe where a single such element is employed for the treatment of an adjacent timber element; Fig. 7 is a side elevation of a length of high-pressure chemical pipe in a form suitable for introduction to the sheath or guide pipe; Fig. 8 is a view similar to Fig. 7, illustrating a high pressure chemical pipe of a form which is flexible throughout its length; Fig. 9 is an enlarged sectional elevation showing a form of joint or connection which may be employed in the structures of either Fig. 7 or Fig. 8; Fig. 10 is a transverse sectional view along line 10—10 of Fig. 9, and Fig. 11 is a transverse sectional view through the sheath or guide pipe and the chemical pipe, when the latter is in operative relation in the sheath pipe.

Referring now by characters of reference to the drawings, there is shown by the horizontal section of Fig. 1, a pair of fragmentary side sills 15, extending between which and forming a closure at the ends of sills 15, is a corresponding sill 16. These sills, as well understood by those in the building arts, are frequently supported directly or indirectly upon concrete or masonry foundations or footing structures, and because of their proximity to the earth below the building, termites are most apt to find their way, upwardly from the ground, to such sill members, thence probably into other timber constituting the supporting frame work, floors and side walls of the building. It is to be noted as advantageous under certain conditions, to apply a toxic fluid to the earth and to the concrete foundation elements below the sills, as well as to the sills proper; in other cases, according to the extent of prevailing damage or liability to same, the vertical timber supports or riser elements, may also require treatment against insect damage, as will be hereinafter discussed.

According to present and preferred practice, the invention is carried out by means including a sheath pipe or directing conduit, one length of which is indicated at 17 and shown as extended along and substantially parallel to the sill element 16, to which it may be fixedly secured as by screw clamps 18 provided in suitable number and at suitable intervals along the sheath pipe. It is to be understood that this location of the sheath or guide pipe 17, is merely exemplary, since under certain conditions these elements are desirably located along the lower or other portions of the masonry foundation, and in still other cases along the ground near the surface thereof, and in yet other cases, somewhat below the surface of the ground. It will also be understood by those familiar with termite habits and extermination, that although normally the lengths of sheath or guide conduit such as 17 will be disposed parallel to the foundation members, exact parallelism is not of the essence of the invention nor necessary by any reason of fluid flow, due to the provision of the separate chemical pipe for supplying liquid to the sheath or guide piping such as 17.

Disposed at a right angle to the length of sheath pipe 17 and communicating therewith, is a similar length of pipe or tubing 20. There may be made as many angular connections as required by the physical arrangement and angular relation of parts of the foundation structure to be treated, whereby from a single supply connection as is generally indicated at 21 (Fig. 1) all of the piping internally of the foundation structure may be supplied with fluid under pressure from one source. Probably in most cases, for simplicity of installation, which may be effected either at the time of construction of the building or later, the system will consist merely of rectilinear piping, without requiring angularly related lengths thereof. However, when the latter condition is to be met, there is provided a novel form of connecting fitting such as indicated at 22. In the preferred form shown, this consists of a somewhat right-triangular box-like structure which may be formed of cast metal, one side of the triangular connection such as 23 being curved, and the other two sides rectilinear. Two of the apices of the triangle are characterized by standard pipe connections 24, and the right angular walls of the fitting 22 are provided with narrow slots therealong, as indicated at 25, showing the connection as it would appear in section along line 4—4 of Fig. 1. The fittings 24 obviously serve to make a fluid connection between the various lengths of piping such as 17 and 20.

A special form of piping is preferably utilized for the sheath pipe, being advantageously formed as metal tubing, but, for reasons of economy in production in substantial quantities, the tubing is not seamed as in usual practice, the wall being formed somewhat short of the usual complete circular section so that there remains a continuous, or substantially continuous, radial slot 30 (Fig. 11). This slot is, by preference, of a relatively reduced width so that when fluid under pressure is supplied to the chamber 31 within the pipe such as 17, this fluid is forcibly emitted in the form of a practically continuous sheet, whereby the fluid is delivered in substantially even volume throughout the practically effective length of the pipe.

Fig. 2 shows essentially the same arrangement of piping as Fig. 1, but embodies a horizontal length 32 connected into the special fitting 22 which leads into a vertical or riser pipe 33, being so arranged for the treatment of a vertical supporting timber. As shown by Figs. 1 and 2, the terminal length of guide or sheath pipe, in each of the several arrangements, is preferably capped as indicated at 34, so as to compel the delivery of fluid through the slots 30.

Although any suitable means may be provided for supplying the treating fluid to the sheath pipe, it has been found most practical and expedient to employ a separate conduit which, for convenience, is referred to as a chemical pipe. Two forms of this are shown respectively by Figs. 7 and 8. The chemical pipe, later to be described in detail, is provided with a hilt plate generally indicated at 35 (Fig. 7) and 40 (Fig. 8).

As shown, the hilt plate is shouldered as at 41 and a portion of reduced diameter 42 is provided preferably with a plurality of short radial pin elements 43. The hilt plate cooperates in making the fluid connection to the sheath pipe, with a shallow sealing member 44 provided along its inner surface with a sealing ring 45 and a connecting slot 46 of a width corresponding roughly to the diameter of the pin 43. As will have appeared, particularly from Fig. 3, this type of connection is in essence a quick-detachable joint having the characteristic of a bayonet coupling or connection whereby a quick sealing attachment of the chemical pipe may be readily made to the sheath pipe at a point located externally of the foundation structure under treatment, as appears from Fig. 1. It is a preference to mount the hilt plate or connection half 41—42 on the chemical pipe so that it may be adjusted in position therealong by suitable means (not shown). This is done in order to compensate for the variable length of chemical pipe desirable to be utilized in the treatment of different building installations.

As means for supplying fluid under pressure to the chemical pipe in the course of the treatment, there is preferably employed a portable pump, compressor and tank assembly such as shown diagrammatically by Fig. 1; the liquid and air pressure tank therefor being indicated generally at 50, provided with a suitable gauge 51, and a discharge or connecting line 52. The pressure supply line from the pump or compressor 53 is indicated at 54, and the pump or compressor driven as by any suitable prime mover, such as an electric motor 55 supplied by a suitable source of current (not shown). If desired, the prime mover 55 may, of course, consist of a small internal combustion engine or other power device.

Although the exact fluid or liquid employed for the method of treatment herein desired, is not material to the method or structure forming the present subject matter, it may be mentioned for completeness that a liquid consisting of B-naphthol or some similar insecticide, in a volatile petroleum solvent, will prove satisfactory.

Referring now more particularly to the preferred construction of the chemical pipe, it is of course desirable that this consist of a flexible tubing or conduit, the characteristic of flexibility as herein referred to, specifically extending to cover not only a hose-like element formed throughout of relatively flexible materials, such as shown by Fig. 8, but a structure which may consist, for example, of short, relatively rigid lengths of metal conduit intervened by suitable lengths of flexible connection, such as rubber hose. Due to the nature of the solvent sometimes employed for the toxic when a liquid is utilized, it is desirable that the rubber stocks be compounded so as to resist the usual solvent action of the toxics and solvents, and to this end, there has been contemplated the use in some instances of synthetic rubber stocks.

To particularize the selected constructions of chemical tubing or conduit, the arrangement shown by Fig. 7 comprises a suitable plurality of lengths of thin-wall metal tubing 60, each length being provided with a connection of threaded type, for example, such as shown by Fig. 9, and including an externally threaded male coupling portion 61 and a companion female coupling element 62. The lengths 60 are not directly connected to each other, but are intervened by a relatively short rubber-hose-like element 63 provided in suitable coupling elements. Preferably each of the lengths 60 and the flexible connection therebetween are provided with a row of fluid emission apertures 64, which may be in the form of drilled openings in the metal-like elements, and which, in the rubber elements are metallically reinforced in a manner to be later described and appearing in Fig. 8. A threaded end cap 65 serves as a closure for the outer or free end of the chemical pipe.

In the embodiment shown by Fig. 8, the several lengths 70 are comprised of a flexible material of the general construction resembling rubber hose, preferably of one or two ply type. This conduit is preferably of small diameter and reasonable flexibility, it being noted as a great preference that the external diameter of the chemical pipe be substantially less than the internal diameter of the sheath pipe such as 17, since this proportion of diameters serves to facilitate the ready introduction and removal of the chemical pipe incident to the treating operation.

Similarly to the embodiment of Fig. 7, the conduit of Fig. 8 is provided with a row of spaced fluid-emission apertures 71, and by further preference these openings are reinforced, each as by a metal gromet 72 of a form which may be applied to the openings from the outside of the hose and deformed in assembly from the outside, so as to facilitate the application of the gromets in production. The advantage of the reinforcing elements such as 72 appears particularly as to those portions of the conduit wherein the bends occur, for example, within the fittings 22. Since it is impossible always to insure the angular position of the openings 64 or 71, if the row thereof happens to fall on the inside of the curve when the hose or conduit is bent, the gromets serve to maintain the openings free and at full area at all times.

Some difficulties have been experienced in the past with piping for the delivery of the treating liquid under pressure, in that the small round jet-like openings tend to become clogged after several years of service, and being in inaccessible locations, are difficult to clean without removing or withdrawing the pipe. A series of experiments and considerable experience has indicated the marked superiority of the slotted form of openings in the sheath pipe, which, as noted, also serves as a guide for introduction and removal of the chemical pipe. The slotted or elongate form of the openings seems particularly to preclude stoppage of material extent, from any cause; in fact, this form of opening has enabled the sheath pipe to be installed below the surface of the ground adjacent to bed plates and other foundation structures generally. The reasonably high pressures preferably employed, say upwardly of fifteen pounds per square inch through the chemical pipe and thence through the sheath pipe, serve more than adequately to clear the openings as well as a fluid passage through a moderate depth of soil, onto the building elements desired to be treated.

It will be understood of course that the arrangements of piping and description thereof thus far given, are merely exemplary of presently preferred practice; the piping may be installed in many different ways according to specific exigencies in reference to any normal or unique arrangement of building foundation elements. As illustrative of the possibilities of the slotted sheath pipe, there is shown by Fig. 5 an internal sill timber or the like such as 75, which may be of rectangular section, and is provided along its diagonally opposite edges, with a pair of the sheath pipes such as 17, the slots 30 of which are directed against the diagonally opposite edges of the timber. This arrangement has the advantage that the sheet of liquid or fluid emitted from the slots, is divided by the edges of the timber in such manner that each of the sheath pipes serves for adequate coverage of a pair of angularly related faces of the timber, whereby a pair of the pipes serve completely to impregnate the entire outside portion of the timber with the treating substance. In case it is desirable or necessary to treat only the exposed inside face, say of a sill timber, an arrangement such as shown by Fig. 6 may be employed, wherein there is provided a single sheath pipe 17 with its slot 30 directed upwardly and toward the upper margin of the inside face 76, of the timber 16. This arrangement serves thoroughly to impregnate the structure above and around the timber, the upper face 78 thereof, and partly by gravity, the full area of the face 76.

The practice preferred and the method involved in connection with the usage of the apparatus herein described, are thought to have been fully apparent from the foregoing detailed description of the items of apparatus, but it may be noted for completeness that it is merely necessary in order thoroughly to saturate the foundation elements of a given building, to insert the chemical pipe to the known and preferably recorded extent, within the sheath pipe, following an appropriate adjustment of the quick-detachable connection along the chemical pipe, a suitable number of lengths thereof having been connected. With the bayonet connection 42—44 completed, the portable compressor or pumping unit is connected into and through the line 52, and the liquid supplied under a relatively high pressure. Due to the range of pressures employed, the fluid is carried without appreciable pressure diminution, through the chemical pipe, and throughout the useful length of the sheath pipe, i. e., the slotted portion thereof. The introduction of the fluid under pressure, for example, a toxic solution, serves initially to fill the sheath pipe with fluid, thereafter to dislodge any obstruction in the slotted openings 30. Continued application of the pressure serves to emit the fluid in a thin, substantially uniform sheet form, and thus to apply it evenly over the length of the foundation element under treatment. It will have appeared that it is preferred that the chemical piping be of a portable and easily removable nature, and that it shall constitute a part of the portable equipment carried with the pumping vehicle and applied to and removed from the sheath pipe incident to the treatment of any given building. It will further have appeared that, as the chemical pipe is inserted in an angular arrangement of the lengths of sheath pipe as in Figs. 1 and 2, the flexible or articulate construction of the chemical pipe enables it to be easily inserted in place around the bend through the fittings such as 22, and as easily to be withdrawn, by virtue of the construction of these connections. It will have also appeared that the means and method as described, serve fully and admirably to attain each of the several objectives hereinabove recited, as well as those implied from the more detailed description.

Although the disclosure of the invention has included a description of many preferred details and items of structure preferably employed, the description is to be understood solely in an exemplary and not in a limiting sense, since many changes may be made in the parts as well as in their combinations and arrangement; it is also to be noted that the steps and order thereof identified with the method, are subject to considerable variation, all without departure from the full intended scope of the invention as defined by the claims hereunto appended.

I claim as my invention:

1. Means for applying a toxic liquid under pressure for insect extermination and prevention, to a supporting element of a building or the like, said means including a pipe fixedly secured in a zone extending along the building element to be treated, and permanently so positioned, the pipe being characterized by lengthwise aligned apertures, in the form of attenuated slots, with the apertured areas directed toward the building element to be treated, and means substantially coextensive with said pipe, for supplying liquid thereto under pressure at closely spaced points along the pipe, such that the liquid delivery from the pipe is substantially uniform throughout its useful length.

2. Means for the pressure treatment of a timber or other supporting element of building structure, against insect damage or the like, said means including a pipe fixedly secured to extend along the building element to be treated and positioned in adjacence thereto, the pipe being provided with a radially presented outlet area or opening directed toward the building element to be treated, the pipe being fixed in angularity with respect thereto, and means for supplying said pipe with the treating liquid, at substantially uniform pressure in each of a plurality of closely spaced zones substantially over the useful length of the pipe.

3. Apparatus for the purpose described, including a sheath pipe extending along the supporting elements of a building, means constituting a closure for one end of the sheath pipe, a quick-detachable fluid connection at the other end of the sheath pipe, the sheath pipe being slotted longitudinally over the greater part of its length, and being secured in position adjacent the building elements with its slotted area presented toward said elements, and a conduit removably disposed within the sheath pipe and carried in part by the quick detachable connection, for supplying liquid in a number of zones along and within the pipe.

4. In apparatus for the purpose described, a slotted guide or sheath pipe fixed in position alongside a building supporting element, such as a foundation or sill, a flexible conduit in the guide pipe provided with a series of spaced wall apertures arranged to supply liquid under pressure as intervals along and interiorly of the guide pipe, and a quick detachable connection between the flexible conduit and the entrance end of the guide pipe.

5. In a conduit system for the application of a termite-exterminating toxic or the like, a slotted guide pipe arranged in angularly related lengths secured along the sills or other supporting elements of a building, a connection between the angularly related lengths of guide pipe, formed to provide spray portions in the vicinity of the corner between the angularly related building supporting elements, and formed to provide a curved passage of substantial radius adjacent the cornering portions of said elements, a chemical pipe for distributing the toxic in liquid form along the interior of the guide pipe and connection, the chemical pipe being insertable through one end of one length of the guide pipe, and flexibly formed so as to be adapted to pass through said curved connecting passage, thence into the angularly related length of guide pipe.

6. In apparatus for the purpose described, a sheath or guide pipe semi-permanently installed along a building supporting element and provided with a radially open slotted area, a closure at one end of the sheath pipe, a bayonet-type sealing connection at the other end of the sheath pipe, and a chemical pipe capable of being flexed through an angle of at least 90 degrees on a moderate radius, and adapted to be inserted in, to extend along and to supply liquid in a series of zones substantially throughout the useful length of the sheath pipe, the chemical pipe extending through one element of the said sealing connection.

WALTER B. HILL.